United States Patent
Becherer et al.

(10) Patent No.: US 8,069,724 B2
(45) Date of Patent: Dec. 6, 2011

(54) FILLING LEVEL INDICATOR HAVING AN EXPLOSION-PROOF HOUSING

(75) Inventors: Frank Becherer, Haslach (DE); Winfried Rauer, Fischerbach (DE); Ralf Koernle, Zell a. H. (DE)

(73) Assignee: Vega Grieshaber KG, Wolfach (DE)

( * ) Notice: Subject to any disclaimer, the term of this patent is extended or adjusted under 35 U.S.C. 154(b) by 481 days.

(21) Appl. No.: 12/285,276

(22) Filed: Oct. 1, 2008

(65) Prior Publication Data
US 2009/0114012 A1 May 7, 2009

Related U.S. Application Data

(60) Provisional application No. 60/960,665, filed on Oct. 9, 2007.

(30) Foreign Application Priority Data
Oct. 8, 2007 (DE) .......... 10 2007 048 203

(51) Int. Cl.
G01F 23/02 (2006.01)
(52) U.S. Cl. .......... 73/325; 73/323
(58) Field of Classification Search .......... 73/323, 73/325
See application file for complete search history.

(56) References Cited

U.S. PATENT DOCUMENTS

| | | | | |
|---|---|---|---|---|
| 3,032,659 A | * | 5/1962 | Bacon et al. | 250/361 R |
| 3,930,160 A | * | 12/1975 | Swinehart | 250/361 R |
| 4,162,826 A | * | 7/1979 | Van der Beck et al. | 359/894 |
| 4,224,047 A | | 9/1980 | Kershaw | |
| 4,788,929 A | | 12/1988 | Krause et al. | |
| 4,809,862 A | * | 3/1989 | Canty | 220/663 |
| 4,977,418 A | | 12/1990 | Canty | |
| 5,763,776 A | * | 6/1998 | Birch et al. | 73/323 |
| 6,359,742 B1 | * | 3/2002 | Canty et al. | 359/894 |
| 6,367,415 B2 | * | 4/2002 | Kim et al. | 118/723 E |
| 6,639,745 B1 | * | 10/2003 | Cheng | 359/894 |

FOREIGN PATENT DOCUMENTS

| | | |
|---|---|---|
| DE | 27 34 897 A1 | 2/1979 |
| DE | 31 29 386 A1 | 2/1983 |
| DE | 198 50 509 A1 | 5/2000 |
| DE | 11 2004 000 530 T5 | 10/2006 |
| DE | 10 2006 019 688 A1 | 11/2007 |
| JP | 4-64021 A | 2/1992 |
| WO | 2004/088684 A2 | 10/2004 |

\* cited by examiner

*Primary Examiner* — Hezron E Williams
*Assistant Examiner* — Rodney T Frank
(74) *Attorney, Agent, or Firm* — The Nath Law Group; Jerald L. Meyer; Stanley N. Protigal

(57) ABSTRACT

Filling level indicator having an explosion-proof housing comprising a glass and a metallic frame, wherein the glass is fused into the frame.

17 Claims, 2 Drawing Sheets

FILLING LEVEL INDICATOR HAVING AN EXPLOSION-PROOF HOUSING

This is a Non-Provisional Application of U.S. Provisional Patent Application Ser. No.: 60/960,665, filed on Oct. 9, 2007, the entire content of which is hereby incorporated by reference in its entirety.

The disclosed subject matter relates to a filling level indicator having an explosion-proof housing with a glass and a metallic frame.

In filling level measurement technology it is often necessary to install filling level sensors or filling level indicators in explosion hazard environments, for example in explosive vapors. To prevent the risk of the filling level indicators causing an explosion, they are accommodated in explosion-proof housings. Such explosion-proof housings have various safety features which ensure that the measurement electronics provided in the housing are not able to emit ignition sparks to the explosion hazard environments. Examples of such features include hermetic sealing as well as grounding of the housing.

Various housing leadthroughs are known for conducting measurement signals into the housing and conducting measured values from the housing, despite the hermetic encapsulation. In addition to cable leadthroughs for measurement signal lines, for optical filling level indicators there are optical compression glass leadthroughs, which are provided with a viewing glass through which optical signals may be conducted into the hermetically encapsulated housing. Thus, for example, a compression glass leadthrough is known in which a thick-walled glass disk is cemented in a mounting ring and is clamped against the mounting ring by means of an additional part. This clamping occurs by use of an additional plunger which is screwed into the threaded joint of the compression glass and presses the glass plate against the body of the compression glass leadthrough.

The known embodiment has the disadvantage that it has an extremely large construction, and its manufacture is complicated due to the large number of necessary parts.

The object of the disclosed subject matter is to provide a filling level indicator having an explosion-proof housing which has a compact design and is also easily and advantageously manufactured.

This object is achieved by use of a filling level indicator having the the glass fused into the frame.

According to the disclosed subject matter, such a filling level indicator having an explosion-proof housing comprises a compression glass leadthrough having a glass and a metallic frame, wherein the glass is fused into the frame.

Since the compression glass leadthrough determines a significant portion of the size of the construction, in particular the diameter of the housing of such a filling level indicator, it is possible to greatly reduce the size of the housing by use of a compression glass leadthrough having a compact design in which the glass is fused directly into the frame. In addition, the manufacturing costs are reduced due to the fact that the compression glass leadthrough is composed of only one part, namely, the frame containing the fused-in glass.

Ideally, the frame of the compression glass leadthrough has a cylindrical design and has an outer thread. Such a design allows the compression glass leadthrough to be screwed into the housing for the filling level indicator, and for a sufficiently long thread the regulatory requirements for explosive environments are also satisfied. For this purpose the thread has a length of at least one centimeter, for example. This length depends, among other factors, on the thread pitch and the volume of the housing, and if necessary must be determined according to the applicable regulations for explosion-proof housings.

In one refinement the metallic frame has a circumferential support collar on a first end, and on a second end a circumferential groove is preferably provided on the end face. The support collar may be used as an additional sealing surface, for example together with an appropriately positioned O-ring. An O-ring may likewise be mounted in the groove on the second end of the frame, which ensures a sealing effect, and may also be used for a lightproof coupling to a photomultiplier, for example.

The filling level indicator may, for example, have a scintillation counter for detection of radioactive radiation. In this case the compression glass leadthrough is situated between a scintillator and the photomultiplier, and is advantageously a component of a wall of the housing. In particular for radiometric filling level indicators, for example a scintillation counter, it is necessary to encapsulate the electronics in an explosion-proof manner while allowing light pulses from the scintillator to be coupled. The explosion-proof encapsulation of the electronics system is necessary in particular because the photomultiplier operates at very high voltages, which results in an increased explosion hazard due to spark formation. When the housing for the filling level indicator has a cylindrical design it is possible, for example, to screw the compression glass leadthrough into one of the cover surfaces of the housing. For this purpose the compression glass leadthrough may be designed as a separately manipulable unit, for example, thus allowing the housing and the compression glass leadthrough to be manufactured separately.

The glass is polished and lapped to ensure coupling of optical signals with the least possible loss. A high level of surface smoothness of the glass is achieved by the polishing and lapping, as the result of which there are no losses from reflection or scattering of the optical signals.

In one refinement of the disclosed subject matter a hollow cylindrical lead shield may be situated around the front-mounted scintillator, so that radioactive radiation acts on the scintillator only from an axial direction. A directional dependency of the detection may thus be achieved in a particularly simple manner.

The disclosed subject matter is described in detail below one by means of one exemplary embodiment with reference to the accompanying figures, which show the following:

DETAILED DESCRIPTION

Figure 1:
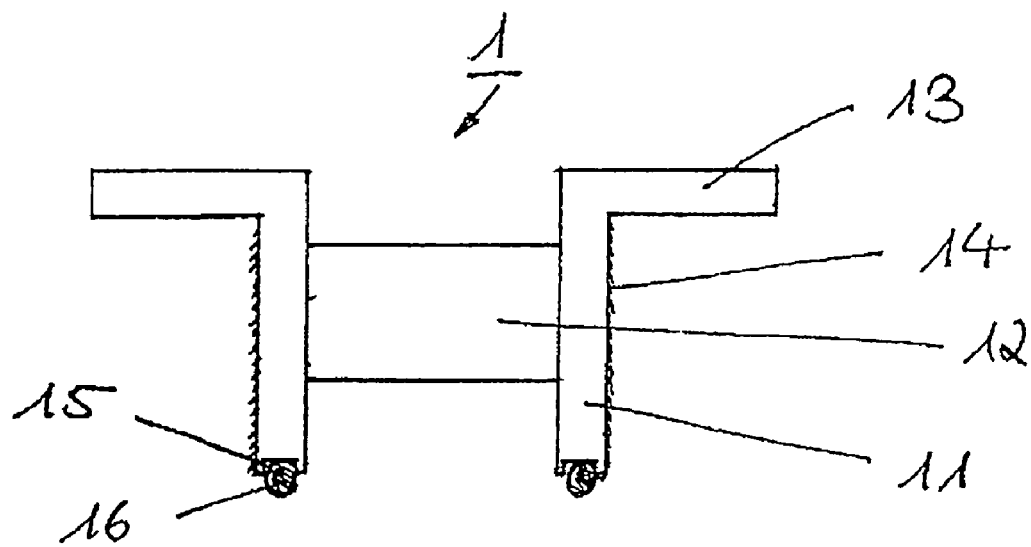
FIG. 1 shows a sectional illustration of the compression glass leadthrough.

FIG. 1 shows a compression glass leadthrough 1 having a cylindrical metallic frame 11 into which a glass 12 is fused. The glass is fused by placing in the metallic frame a plunger that is resistant to high heat, for example a ceramic plunger, which has a diameter corresponding approximately to the inner diameter of the frame 11 and extends up to one-third of the height of the frame 11. Molten glass is then filled into the interior of the frame from above. This molten glass spreads out horizontally and ultimately contacts the inner walls of the frame 11. As soon as enough glass has been added, there is a waiting period until the glass and the preheated frame 11 have cooled. Because the metallic frame 11 has a higher temperature coefficient than glass, the metallic frame 11 tends to contract to a greater extent than the glass. Pressure-tightness is achieved in this manner. Alternatively, a prefabricated glass blank may be inserted into a lathed part and passed through a continuous-feed oven for melting, thereby likewise fusing the glass into the frame.

On a first end the cylindrical frame 11 has a circumferential support collar 13 which widens the frame 11 in the manner of a collar. On the end face of a second end of the frame 11 a circumferential groove 15 is provided, in which an O-ring 16 may be mounted. The frame 11 is provided with an outer thread 14 over its entire length. The outer thread 14 is used to screw the compression glass leadthrough 1 to a housing 2, as described below. The glass 12 is positioned halfway up the frame 11, and has a thickness between 0.8 and 1.3 cm. The diameter of the glass is between 2 and 3 cm.

Figure 2:
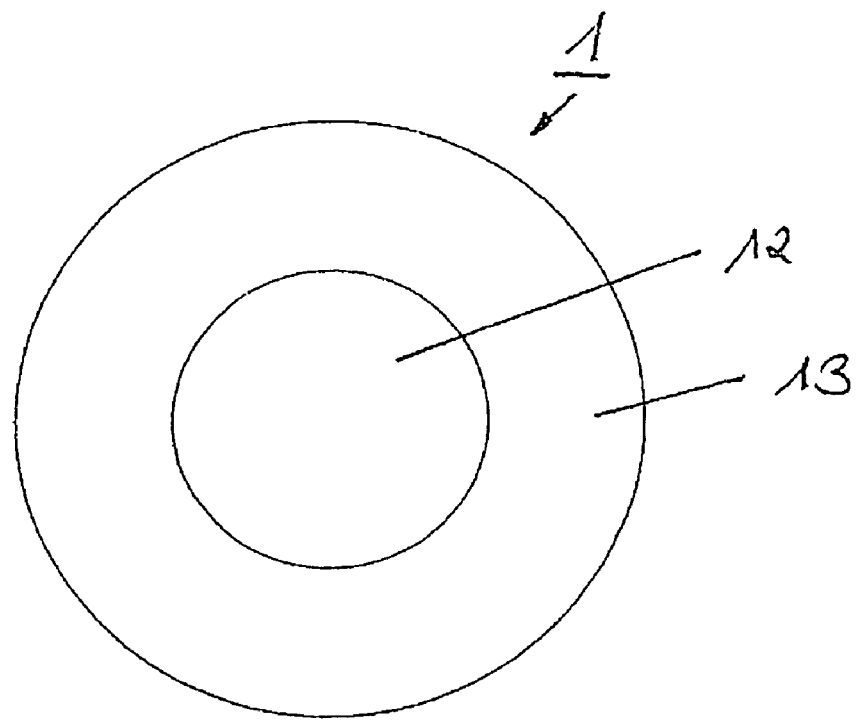
FIG. 2 shows the compression glass leadthrough from FIG. 1 in a view from above.

FIG. 2 shows a view from above of the compression glass leadthrough 1 from FIG. 1. The collar-like support collar 13 and a centrally located opening containing the fused glass 12 are shown particularly clearly in this illustration.

Figure 3:
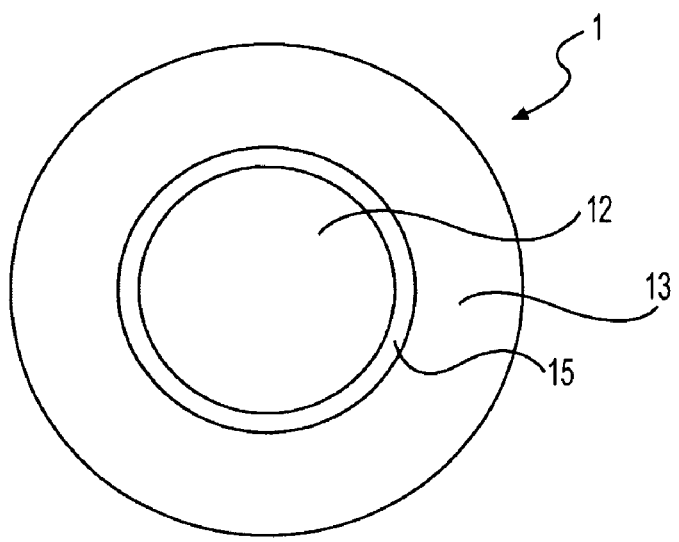
FIG. 3 shows the compression glass leadthrough from FIGS. 1 and 2 in a view from below.

FIG. 3 shows a view from below of the compression glass leadthrough 1 from FIGS. 1 and 2. The centrally positioned glass 12 and the circumferential groove 15 provided on the second end of the frame 11 are clearly shown in this illustration of the compression glass leadthrough 1. The O-ring 16 is not illustrated in FIG. 3. The support collar 13 may be used as a mechanical stop when the compression glass leadthrough is screwed in, and may also serve as a sealing surface when an additional O-ring is provided on an opposite surface of the housing.

Figure 4:
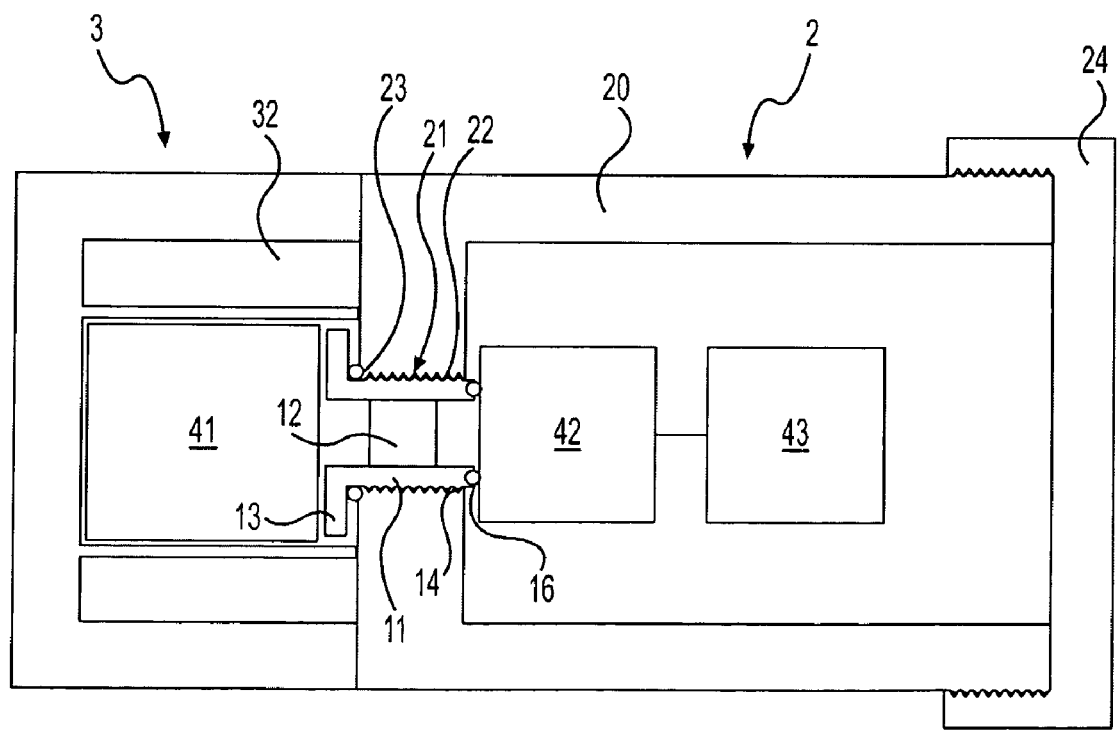
FIG. 4 shows a sectional illustration of a filling level indicator having an explosion-proof housing and a compression glass leadthrough as illustrated in FIGS. 1 through 3.

FIG. 4 shows a radiometric filling level indicator having an explosion-proof housing 2 into which a compression glass leadthrough 1, as described in FIGS. 1 through 3, is screwed. The housing 2 has a cylindrical body 20 which may be closed off at the rear by a sealing cap 24. Provided in a cover surface of the body 20 at the front side is a leadthrough 21 having an inner thread 22 into which the compression glass leadthrough I with its outer thread 14 may be screwed. An O-ring 23 for further sealing of the housing 2 is provided between the support collar 13 for the compression glass leadthrough 1 and the front-side cover surface of the body 20. A cup-shaped cover 3 is provided at the front side, in which a hollow cylindrical lead shield 32 and a cylindrical scintillator 41 resting in the lead shield 32 are situated. The scintillator 41 rests centrally above the compression glass leadthrough 1, so that light flashes that are generated in the scintillator by radioactive radiation may be conducted through the glass 12 and into the interior of the housing 2. A photomultiplier 42 resting inside the housing 2 converts the light flashes from the scintillator 41 into an electrical signal. Connected downstream from the photomultiplier 42 is a measuring device 43 which calculates a measurement signal from the electrical signals according to a selected measurement system.

It is noted that the scintillator may also have a tubular design, for example. In this case, however, directionally dependent detection of radioactive radiation is not possible.

The compactly designed explosion-proof housing 2 having the compression glass leadthrough 1 allows such a filling level indicator to be manufactured in a particularly advantageous manner.

LIST OF REFERENCE NUMERALS

1 Compression glass leadthrough
2 Housing
3 Cover
4 Scintillation counter
11 Frame
12 Glass
13 Support collar
14 Outer thread
15 Groove
16 O-ring
20 Body
21 Leadthrough
22 Inner thread
23 O-ring
24 Sealing cap
32 Lead shield
41 Scintillator
42 Photomultiplier
43 Measuring device

The invention claimed is:

1. Filling level indicator having an explosion-proof housing comprising:
   a compression glass leadthrough comprising a glass and a metallic frame;
   wherein the glass is fused into the frame; and
   the compression glass leadthrough is situated between a scintillator and a photomultiplier.

2. Filling level indicator according to claim 1, characterized in that the frame has a cylindrical design.

3. Filling level indicator according to claim 2, characterized in that the frame has a threaded portion with an outer thread.

4. Filling level indicator according to claim 3, characterized in that the threaded portion has a length of at least 1 cm.

5. Filling level indicator according to claim 1 claim 4, characterized in that the frame has a circumferential support collar on a first end.

6. Filling level indicator according to claim 2, characterized in that the frame has a circumferential groove at the end face on a second end.

7. Filling level indicator according to claim 1, characterized in that the filling level indicator has a scintillation counter.

8. Filling level indicator according to claim 1, characterized in that the compression glass leadthrough is a component of a wall of the housing.

9. Filling level indicator according to claim 1, characterized in that the compression glass leadthrough is a separately manipulable unit.

10. Filling level indicator according to claim 1, characterized in that the glass is polished and lapped.

11. Filling level indicator according to claim 1, characterized in that the glass has a diameter between 2 and 3 cm.

12. Filling level indicator according to claim 1, characterized in that the glass has a thickness between 0.8 and 1.3 cm.

13. Filling level indicator according to claim 1, characterized in that the glass rests halfway up the frame.

14. Filling level indicator according to claim 1, characterized in that the housing is fabricated from metal.

15. Filling level indicator according to claim 1, characterized in that a hollow cylindrical lead shield is situated around the scintillator.

16. Filling level indicator according to claim 1,
characterized in that the frame has a circumferential support collar on a first end.

17. Filling level indicator having an explosion-proof housing comprising:
- a compression glass leadthrough comprising a glass and a metallic frame; the glass fused into the metallic frame, thereby forming a hermetic seal;
- the metallic frame having a cylindrical configuration having an outer thread and the compression glass leadthrough situated between a scintillator and a light detection device capable of converting the light from the scintillator into an electrical signal; and
- the frame having a cylindrical design with a threaded portion of at least 1 cm, and the frame further has a circumferential support collar on a first end.

* * * * *